Feb. 13, 1934.  F. P. HESS  1,947,342
GRINDING MILL
Filed Dec. 31, 1931  2 Sheets-Sheet 1
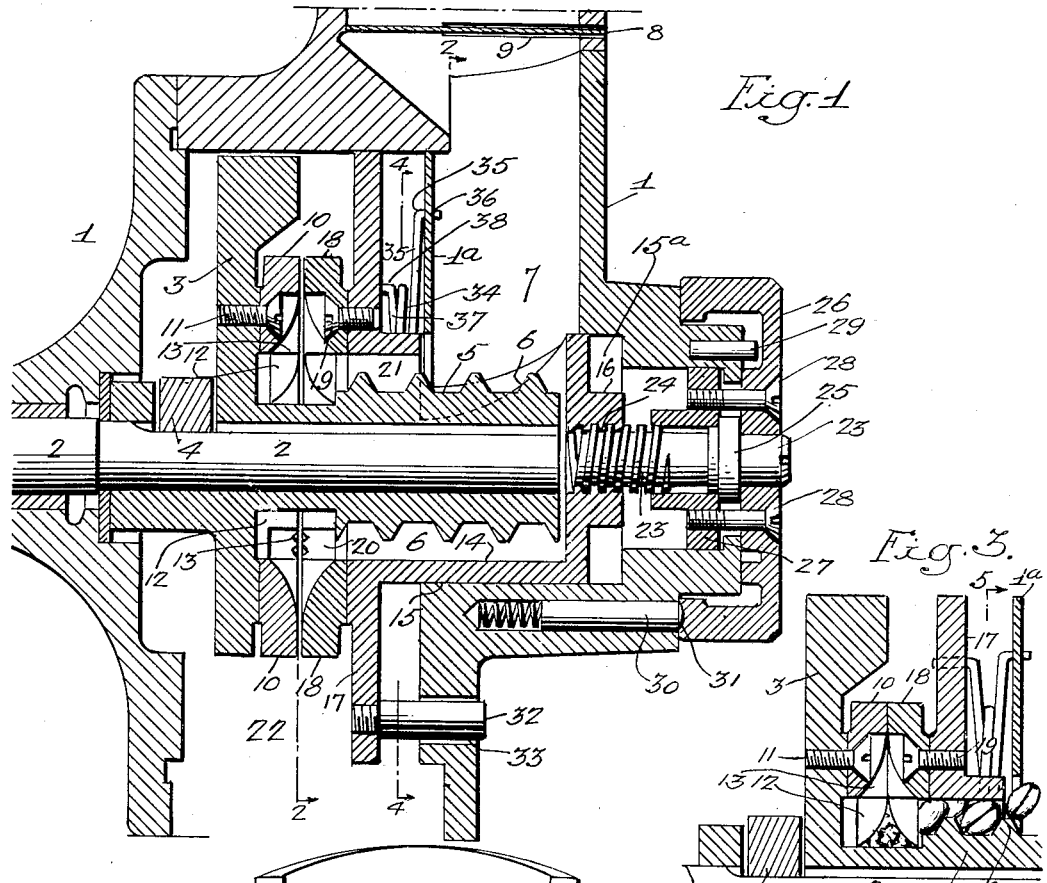
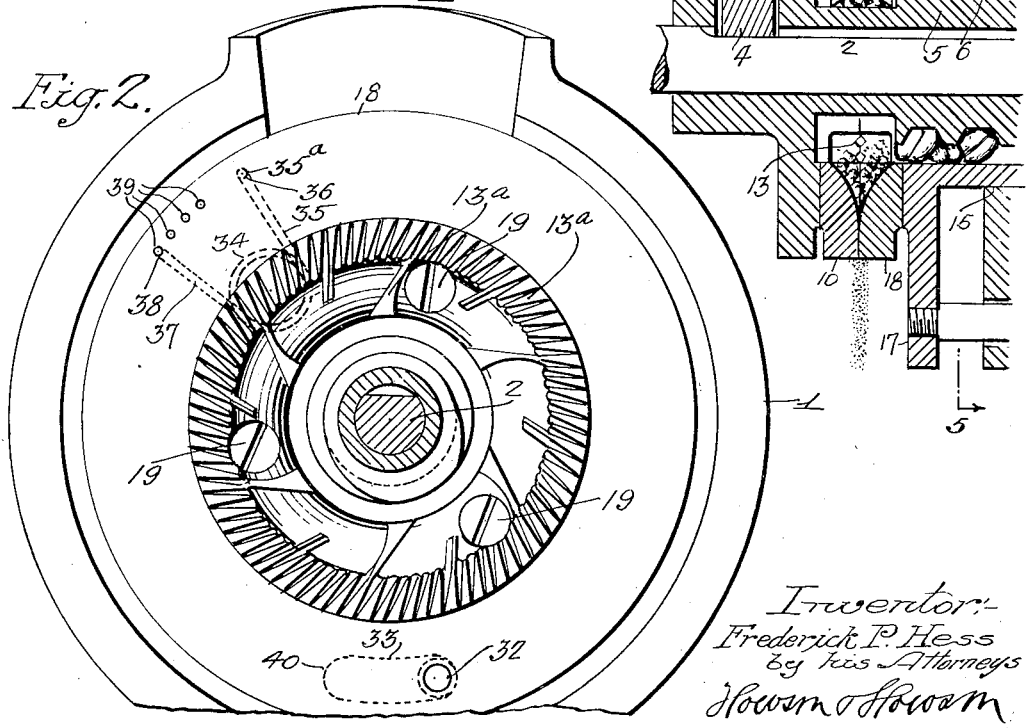
Inventor:
Frederick P. Hess
by his Attorneys
Howson & Howson Feb. 13, 1934.   F. P. HESS   1,947,342
GRINDING MILL
Filed Dec. 31, 1931   2 Sheets-Sheet 2
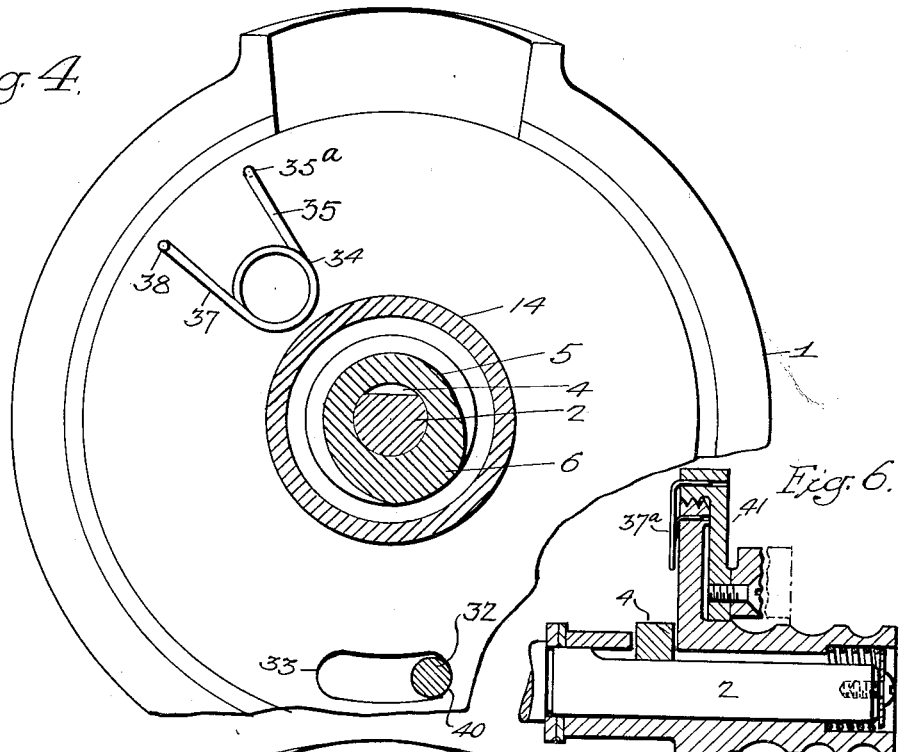
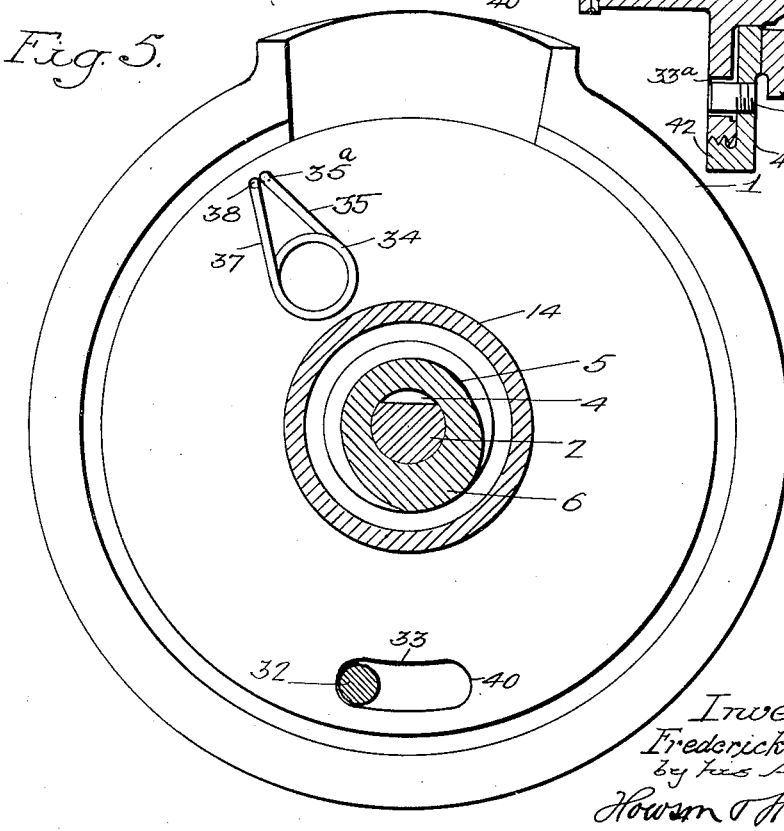

Patented Feb. 13, 1934

1,947,342

UNITED STATES PATENT OFFICE 1,947,342

GRINDING MILL

Frederick P. Hess, Philadelphia, Pa., assignor to The Enterprise Manufacturing Company of Pennsylvania, Philadelphia, Pa., a corporation of Pennsylvania Application December 31, 1931
Serial No. 584,199

10 Claims. (Cl. 83—8)

My invention relates to certain improvements in grinding mills, particularly mills for grinding coffee, spices, and the like.

When the ordinary mill is set to grind fine, the grinding discs wear away very rapidly and they screech after the coffee, for instance, has passed through the mill and before the mill ceases rotation. This is due to the fact that the grinding discs are adjusted so close that they are in actual contact, and this is necessary when coffee is being ground exceedingly fine.

One object of my invention is to design the mill so that it will grind very fine, and the rapid wearing away of the grinding discs and the screeching will be avoided.

A further object of the invention is to so design the mill that the mill will grind exceedingly fine while the coffee is in the mill, but as soon as the coffee has passed through the mill the grinding discs will be automatically separated so as to prevent undue wear and screeching.

The invention also relates to certain details which will be described hereinafter.

In the accompanying drawings:

Fig. 1 is a sectional view of sufficient of a grinding mill to illustrate my invention, showing the grinding discs separated;

Fig. 2 is a sectional view on the line 2—2 Fig. 1;

Fig. 3 is a view similar to Fig. 1, showing the coffee in the mill and the grinding discs in close contact, due to the presence of the coffee;

Fig. 4 is a sectional view on the line 4—4, Fig. 1, showing the spring member expanded;

Fig. 5 is a sectional view on the line 5—5, Fig. 3, showing the spring member contracted; and Fig. 6 is a view of a modification of the invention.

1 is the casing of a coffee mill in the present instance. 2 is the main shaft of the mill, which can be driven by any suitable power mechanism. 3 is the runner of the mill, which is secured to the shaft by a key 4 in the present instance, so that it will turn with the shaft. On the extended hub 5 of this runner is a feed screw 6. The hub extends to a point below the throat 7, which is directly under the hopper 8 of the mill. In the hopper is a gate 9, which can be adjusted to control the flow of coffee to the mill. Secured to the runner by screws 11 in the present instance is a grinding disc 10, which has an open center 12 and teeth 13.

14 is the carrier, shaped as shown in Fig. 1. The body portion of this carrier fits the opening 15 in the casing 1, and has an annular back plate 16, which extends into the rear portion 15a of the opening. The carrier can be adjusted towards or from the runner. At the outer end of the carrier 14 is a disc 17, to which a grinding disc 18 is secured by screws 19. The disc 18 has teeth 13a, which are similar to the teeth 13 of the disc 10 in the present instance, but it will be understood that the teeth of these two discs may be modified without departing from the essential features of the invention. The disc is a substantially fixed disc and opposes the rotating disc 10.

The disc 18 has an open center 20 which communicates with a passage 21 in the carrier 14, and this passage communicates with the throat 7, so that coffee fed from the hopper passes through the throat 7 and the passage 21, and the feed screw 6 carries the coffee through the passage into the cavity formed by the open centers 12 and 20 of the grinding discs, and passes through the space between the discs and is ground to the proper degree of fineness, passing out through the discharge opening 22 in the lower portion of the casing 1.

23 is an adjusting screw for adjusting the grinding disc 18 in respect to the grinding disc 10. The screw 23 is adapted to internal threads 24 in the back plate 16 of the carrier 14 so that when the screw is turned the carrier and its grinding disc are moved to or from the grinding disc 10.

In the present instance the shank of this screw has a collar 25, which is clamped between a hand-wheel 26 and a sliding head 27 by screws 28, so that on turning the hand-wheel 26 the adjusting screw can be turned. 29 is a pin to limit the movement of the hand-wheel 26 and 30 is a spring-pressed pin which engages notches 31 in the hand-wheel so as to hold the hand-wheel in the position to which it is adjusted. 32 is a pin, which is secured to the disc 17 of the carrier 14, and this pin extends into a slot 33 in the casing. The slot allows the disc and its carrier to have a certain limited rotary motion.

34 is a coil spring in the present instance, having two arms. One arm 35 is bent at 35a and extends through a hole 36 in the fixed plate 1a of the casing 1, which forms one wall of the throat 7. The other arm 37 is bent at 38 and extends into one of a series of holes 39 in the disc 17 of the carrier 14. The spring normally holds the carrier 14 and its grinding disc 18 away from the grinding disc 10, as shown in Figs. 1 and 4, due to the threaded portion 24 of the carrier engaging the threads of the adjusting screw 23. The retracting movement is limited by the pin 32 contacting with the end 40 of the slot 33. Thus the two discs are held out of contact and the excessive wearing away of the plates and the screeching due to the contacting disc is entirely avoided, but when the coffee is fed from the hopper into the mill then the coffee is broken by the teeth 13 and 13a, and the particles of the coffee couple the stationary disc 18 to the rotating disc 10. Consequently the carrier 14 is turned to a limited extent and is moved with its disc towards the rotating disc 18 due to the fact that its screw thread 24 is in engagement with the adjusting screw 23. The forward movement will continue until the grinding disc 18 is substantially in contact with the grinding disc 10, and the coffee will be ground to the desired degree of fineness, and as long as coffee is being fed to the discs the position of the two discs will remain substantially the same, but as soon as the coffee has passed through the mill the carrier is free and the spring 34 will return it to its normal position, so as to separate the grinding disc 18 from the disc 10, thus avoiding the excessive wearing away of the discs and the objectionable screeching, which is due in the ordinary mill to the actual contact of the two grinding discs when the mill is empty. The spring is rather delicate so that it will readily yield when there is any material between the plates, in order that the rotating plate will carry the other plate a sufficient distance to bring it substantially in contact with the rotating plate and grind the material to the proper degree of fineness. While I have shown a coil spring, other types of springs may be used without departing from the essential features of the invention.

In Fig. 6 is illustrated a modification of the invention, in which the rotating disc is moved toward the non-rotating disc. In this instance the periphery of the runner 33a is threaded on its periphery and a carrier 41 has a flange 42 provided with an internal thread which meshes with the thread on the runner 33a. The grinding disc 10a is secured to the carrier 41.

A spring 34a, similar to the spring 34, Fig. 1, has two arms, one arm being attached to the carrier 41 and the other arm attached to the runner 33a. A stop pin 32a on the carrier extends into a slot in the runner and limits the independent rotary movement of the carrier 41 on the runner 33a.

I claim:

1. The combination in a grinding mill, of a casing; a hopper; a throat forming a continuation of the hopper; a carrier mounted in the casing; a grinding disc secured to the carrier, said carrier having a threaded portion; an adjusting screw mounted in the casing and engaging the threads of the carrier so as to adjust the carrier in the casing; a slot in the casing; a pin on the carrier extending into the slot, the pin limiting the rotative movement of the carrier and of the substantially fixed disc; a disc opposite the substantially fixed disc; a rotating shaft for driving the last-mentioned disc; and a spring connected to the casing and to the carrier, and tending to rotate the latter on the screw to thereby normally hold the substantially fixed disc away from the rotating disc, said spring yielding to allow the said substantially fixed disc to move towards the rotating disc when the material being ground is passing through the mill.

2. The combination in a grinding mill, of two grinding discs, one of said discs being a rotating disc; means for axially relatively adjusting the discs; means dependent on said adjustment for resiliently maintaining said discs in spaced relation; and automatic means for bringing the discs substantially into contact against the action of said maintaining means when the material to be ground is passing through the mill.

3. The combination in a mill, of two grinding discs; means for driving one of said discs; means for yieldingly holding the opposing disc out of contact with the rotating disc; and means operative by the coupling action of the material being ground to move the opposing disc towards the rotating disc during the process of grinding, said yieldable holding means retracting the opposing disc as soon as the material has passed from between the discs.

4. The combination in a grinding mill, of a casing; a substantially fixed disc mounted in the casing; a carrier to which the said disc is secured, said carrier having a threaded portion and an adjusting screw adapted to the threads of the carrier, and said carrier having a limited rotation effective through said screw to axially adjust the disc; a spring having two arms, one arm attached to the casing, the other arm attached to the carrier; a rotating disc opposite the substantially fixed disc; and means for rotating said disc, said spring normally resiliently retaining the fixed disc in axially spaced relation to the rotary disc but permitting rotation of the fixed disc with the rotating disc and consequent axial adjustment of the fixed disc toward the rotating disc.

5. The combination in a grinding mill, of a casing; a substantially fixed disc mounted in the casing; a carrier to which the said disc is secured, said carrier being mounted for limited rotation and having a threaded portion and an adjusting screw adapted to the threads of the carrier; a spring having two arms, one arm attached to the casing, the other arm attached to the carrier, whereby the latter is normally rotated to a position on the screw wherein the fixed disc is axially spaced from an opposed rotating disc; a rotating disc opposite the substantially fixed disc; means for rotating said disc, the material being ground acting as a coupling for the discs whereby the fixed disc is rotated against the spring; and a stop to limit the resulting movement of the substantially fixed disc toward the rotary disc.

6. The combination in a grinding mill, of a pair of opposed grinding discs; means normally operative for relatively adjusting said discs to a predetermined spaced relation; means for relatively rotating said discs; and means operative by the coupling action on said discs of the material being ground for relatively adjusting the discs toward each other.

7. The combination in a grinding mill, of a pair of opposed grinding discs; resilient means tending to adjust one of said discs to a normal position spaced from the other; and means operative by the coupling action on said discs of the material to be ground for relatively adjusting said discs toward each other from said normal position.

8. The combination in a grinding mill, of a pair of opposed grinding discs; resilient means tending to adjust one of said discs to a normal position spaced from the other; means operative by the coupling action on said discs of the material to be ground for relatively adjusting said discs toward each other from said normal position; and means for limiting the extent of said adjustments.

9. The combination in a grinding mill, of a pair of opposed grinding discs, one of which is mounted for limited rotary movement; means operative by said rotary movement for adjusting the disc axially, the direction of said axial movement depending on the direction of rotation; means for driving the other of said discs; means for feeding material to be ground to the discs, the coupling action of said material tending to carry the first-named disc with and in the same direction of rotation as the driven disk and axially toward the latter through the medium of said adjusting means; and resilient means tending to rotate the first-named disc in the reverse direction.

10. The combination in a grinding mill, of a casing; a rotary grinding disc; an opposed oscillatory grinding disc; means operative by rotary movement of the oscillatory disc to move the disc in the axial direction; means tending to rotate the last-named disc in a direction opposite to the rotation of the rotary disc whereby said axial moving means effects a retraction of the oscillatory from the rotary disc, said rotating means permitting a reverse rotary movement of the oscillatory disc; and means for feeding material to be ground to said discs whereby the coupling action upon the discs of said material tends to effect an axial movement of the oscillatory toward the rotary disc.

FREDERICK P. HESS.